US012180844B1

(12) United States Patent
Savard

(10) Patent No.: US 12,180,844 B1
(45) Date of Patent: Dec. 31, 2024

(54) LABYRINTH SEAL AND REMOVAL FROM GAS TURBINE ENGINE

(71) Applicant: Pratt & Whitney Canada Corp., Longueuil (CA)

(72) Inventor: Philippe Savard, Montréal (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/452,945

(22) Filed: Aug. 21, 2023

(51) Int. Cl.
*F01D 11/02* (2006.01)
*F01D 11/00* (2006.01)
*F01D 11/08* (2006.01)

(52) U.S. Cl.
CPC ............ *F01D 11/02* (2013.01); *F01D 11/001* (2013.01); *F01D 11/08* (2013.01); *F05D 2220/32* (2013.01); *F05D 2240/55* (2013.01)

(58) Field of Classification Search
CPC ........ F01D 11/02; F01D 5/005; F01D 11/001; F05D 2240/55; F02C 7/28; F16J 15/3268; F16J 15/447
See application file for complete search history.

(56) References Cited

U.S. PATENT DOCUMENTS 10,961,860 B2 * 3/2021 Chuong ............... F16J 15/3268
11,933,180 B2 * 3/2024 Macfarlane .......... F16J 15/4472

* cited by examiner

*Primary Examiner* — Eldon T Brockman
(74) *Attorney, Agent, or Firm* — CANTOR COLBURN LLP

(57) ABSTRACT

A seal of a gas turbine engine includes a rotationally stationary seal element secured to a rotationally fixed component of the gas turbine engine, and a labyrinth seal element secured to and rotatable with a rotational component of the gas turbine engine. The labyrinth seal element includes a seal base, and a plurality of seal fins extending outwardly from the seal base, the plurality of seal fins configured to define a seal interface between the plurality of seal fins and the rotationally stationary seal element to prevent airflow therethrough. A removal face is defined integral to an end fin of the plurality of seal fins. The removal face is configured for application of a removal force thereto to remove the labyrinth seal from an installed position in the gas turbine engine.

20 Claims, 3 Drawing Sheets

LABYRINTH SEAL AND REMOVAL FROM GAS TURBINE ENGINE

BACKGROUND

Exemplary embodiments pertain to the art of gas turbine engines, and in particular to removal of labyrinth seal components from gas turbine engines for servicing and/or replacement.

Cavities in gas turbine engines, for example, cavities between turbine rotors, need to be sealed to ensure a proper air pressure distribution along the gas turbine engine flow path. Labyrinth seals are often utilized as an interstage seal mechanical feature, located radially between a rotating component such as a turbine rotor, and a stationary component such as a turbine stator. The labyrinth seal components are typically installed as a tight fit, such as a press fit, to the rotating component. As such, the labyrinth seal should include removal features to allow for disassembly for servicing and/or replacement of the labyrinth seal and/or the rotating component to which the labyrinth seal is installed.

As engine configurations become more compact, space in the cavity for the use of typical removal features such as flanges added to the labyrinth seal can be restriction, risking damage to adjacent components during the removal process.

BRIEF DESCRIPTION

In one exemplary embodiment, a seal of a gas turbine engine includes a rotationally stationary seal element secured to a rotationally fixed component of the gas turbine engine, and a labyrinth seal element secured to and rotatable with a rotational component of the gas turbine engine. The labyrinth seal element includes a seal base, and a plurality of seal fins extending outwardly from the seal base, the plurality of seal fins configured to define a seal interface between the plurality of seal fins and the rotationally stationary seal element to prevent airflow therethrough. A removal face is defined integral to an end fin of the plurality of seal fins. The removal face is configured for application of a removal force thereto to remove the labyrinth seal from an installed position in the gas turbine engine.

Additionally or alternatively, in this or other embodiments a face height of the removal face from the seal base is less than a fin height of the adjacent seal fin from the seal base.

Additionally or alternatively, in this or other embodiments the removal force is applied substantially perpendicular to the removal face.

In another exemplary embodiment, a turbine assembly of a gas turbine engine includes at least one turbine rotor located at and rotatable about an engine central axis, a turbine stator positioned axially adjacent to the at least one turbine rotor, and a seal configured to seal between the at least one turbine rotor and the turbine stator. The seal includes a stator seal element secured to the turbine stator, and a labyrinth seal element secured to and rotatable with the at least one turbine rotor. The labyrinth seal element includes a seal base, and a plurality of seal fins extending outwardly from the seal base, the plurality of seal fins configured to define a seal interface between the plurality of seal fins and the stator seal element to prevent airflow therethrough. A removal face is defined integral to an end fin of the plurality of seal fins. The removal face is configured for application of a removal force thereto to remove the labyrinth seal from an installed position in the gas turbine engine.

Additionally or alternatively, in this or other embodiments a face height of the removal face from the seal base is less than a fin height of the adjacent seal fin from the seal base.

Additionally or alternatively, in this or other embodiments a face height of the removal face from the engine central axis is less than a fin height of the adjacent seal fin from the engine central axis.

Additionally or alternatively, in this or other embodiments the removal force is applied in an axial direction.

Additionally or alternatively, in this or other embodiments the at least one turbine rotor is two turbine rotors. The turbine stator is positioned axially between the two turbine rotors.

Additionally or alternatively, in this or other embodiments the seal base is secured to both a first rotor of the two rotors and a second rotor of the two rotors.

Additionally or alternatively, in this or other embodiments the plurality of seal fins extend radially outwardly from the seal base toward the stator seal element.

Additionally or alternatively, in this or other embodiments the removal face extends radially outwardly from the seal base.

Additionally or alternatively, in this or other embodiments the labyrinth seal is secured to a blade platform of the at least one rotor.

In yet another exemplary embodiment, a gas turbine engine includes a combustor configured to combust a mixture of air and fuel, and a turbine assembly including at least one turbine rotor driven to rotate about an engine central axis by a flow of combustion gases from the combustor, and a turbine stator located axially adjacent to the at least one turbine rotor. A seal is configured to seal between the at least one turbine rotor and the turbine stator. The seal includes a stator seal element secured to the turbine stator, and a labyrinth seal element secured to and rotatable with the at least one turbine rotor. The labyrinth seal element includes a seal base, and a plurality of seal fins extending outwardly from the seal base. The plurality of seal fins are configured to define a seal interface between the plurality of seal fins and the stator seal element to prevent airflow therethrough. A removal face is defined integral to an end fin of the plurality of seal fins. The removal face is configured for application of a removal force thereto to remove the labyrinth seal from an installed position in the gas turbine engine.

Additionally or alternatively, in this or other embodiments a face height of the removal face from the engine central axis is less than a fin height of the adjacent seal fin from the engine central axis.

Additionally or alternatively, in this or other embodiments the removal force is applied in an axial direction.

Additionally or alternatively, in this or other embodiments the at least one turbine rotor is two turbine rotors. The turbine stator is located axially between the two turbine rotors.

Additionally or alternatively, in this or other embodiments the seal base is secured to both a first rotor of the two rotors and a second rotor of the two rotors.

Additionally or alternatively, in this or other embodiments the plurality of seal fins extend radially outwardly from the seal base toward the stator seal element.

Additionally or alternatively, in this or other embodiments the removal face extends radially outwardly from the seal base.

Additionally or alternatively, in this or other embodiments the labyrinth seal is secured to a blade platform of the at least one rotor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
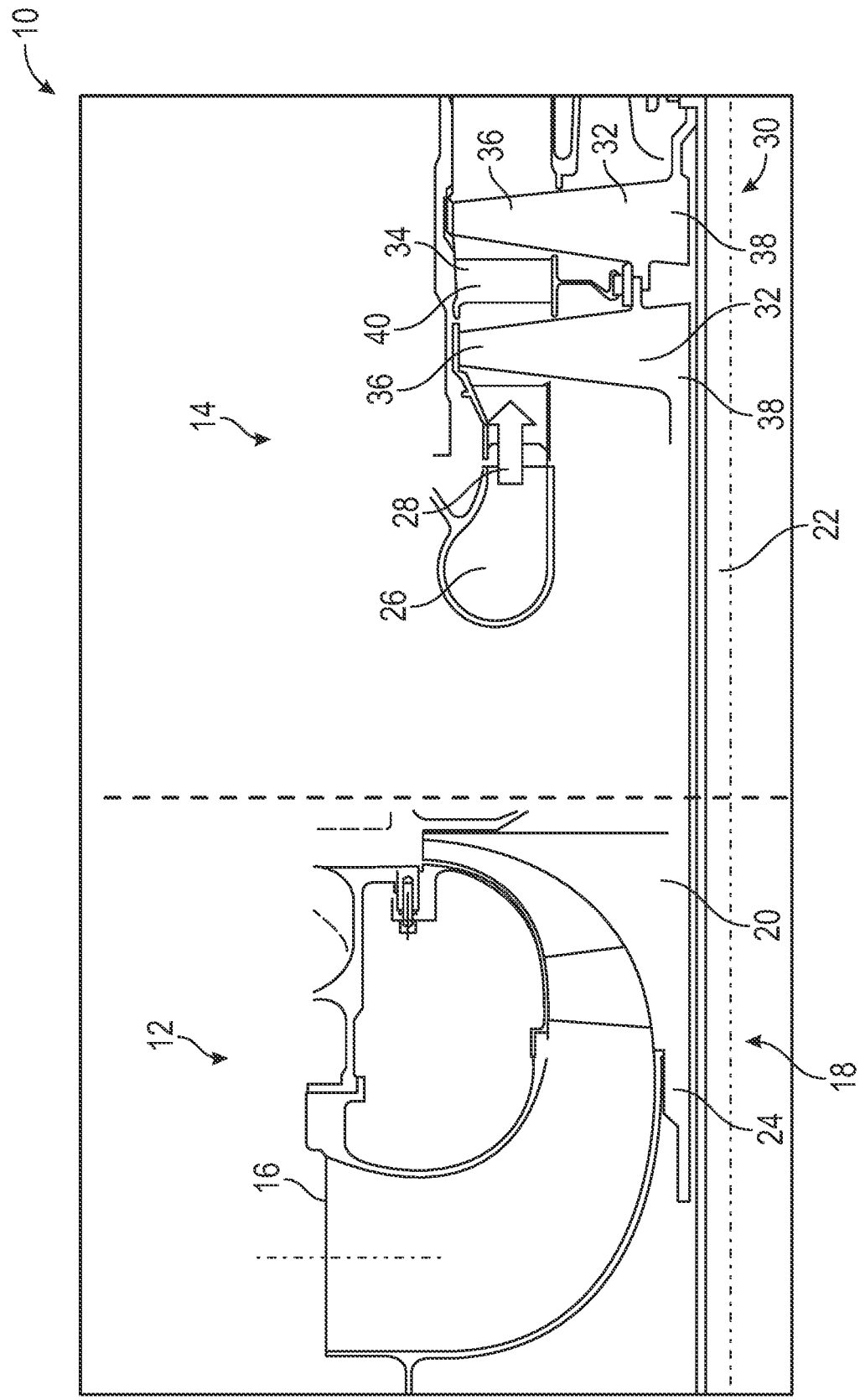
FIG. 1 is a schematic illustration of an embodiment of a gas turbine engine.

Illustrated in FIG. 1 is an embodiment of a gas turbine engine 10. The engine generally includes a compressor section 12 and a hot section 14. The compressor section 12 includes an inlet 16 and a compressor 18 having a compressor rotor 20 rotatable about an engine central axis 22. In some embodiments, the compressor rotor 20 is mounted on a compressor shaft 24 located at the engine central axis 22. In some embodiments, such as illustrated in FIG. 1, the compressor 18 is a centrifugal compressor 18 and the compressor rotor 20 is an impeller. One skilled in the art, however, will readily appreciate that the gas turbine engine 10 may include other types of compressor 18, for example, an axial compressor.

The hot section 14 includes a combustor 26 at which compressed airflow output from the compressor 18 is mixed with a fuel and combusted, producing hot combustion gases 28, which are directed to a turbine 30. The turbine 30 includes one or more turbine rotors 32 rotatable about the engine central axis 22 and one or more turbine stators 34 located axially adjacent to the one or more turbine rotors 32. The turbine rotors 32 include a plurality of turbine blades 36 fixed to a rotor hub 38. The one or more turbine stators 34 are fixed relative to the engine central axis 22 and include a plurality of stator vanes 40. The hot combustion gases 28 drive rotation of the turbine rotors 32, which drives rotation of the compressor rotor 20 and provides thrust for the gas turbine engine 10.

Figure 2:
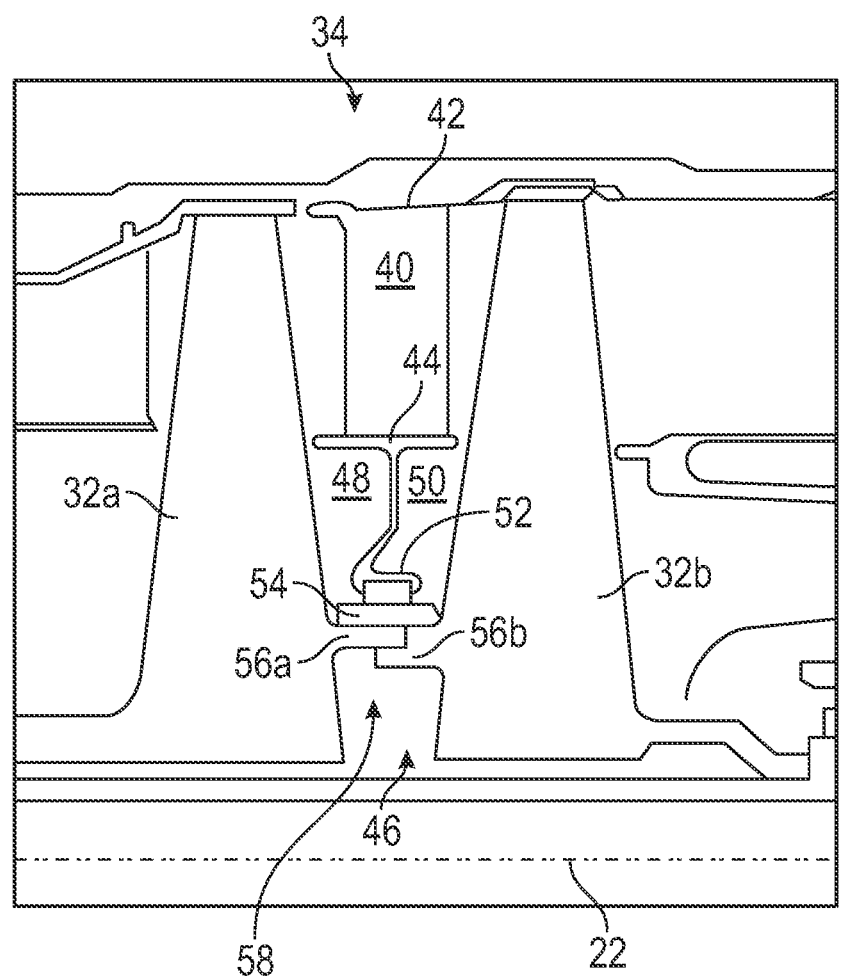
FIG. 2 is a partial cross-sectional view illustrating an embodiment of a turbine stator arrangement of a gas turbine engine.

Referring to FIG. 2, illustrated is an embodiment of a turbine stator 34. The turbine stator 34 includes a plurality of stator vanes 40 extending between a radially outer platform 42 and a radially inner platform 44. A seal assembly 46 is defined between the inner platform 44 and the turbine rotors 32 to prevent leakage of airflow from a first cavity 48 to a second cavity 50 without passing through the turbine stator 34. The seal assembly 46 includes a rotationally static seal element, such as inner airseal 52, which is located at the inner platform 44. A rotating seal element, such as a labyrinth seal 54, is secured to and rotates with the turbine rotors 32. The inner airseal 52 interfaces with the labyrinth seal 54 to seal between the first cavity 50 and the second cavity 52.

In the embodiment of FIG. 2, the turbine rotors 32 have rotor flanges, which in some embodiments are turbine blade platforms 56, on which the labyrinth seal 54 is secured. In some embodiment, a first blade platform 56a of a first turbine rotor 32a at least partially axially overlaps a second blade platform 56b of a second turbine rotor 32b, defining a rotor interface 58. The labyrinth seal 54 may be located at the rotor interface 58.

Figure 3:
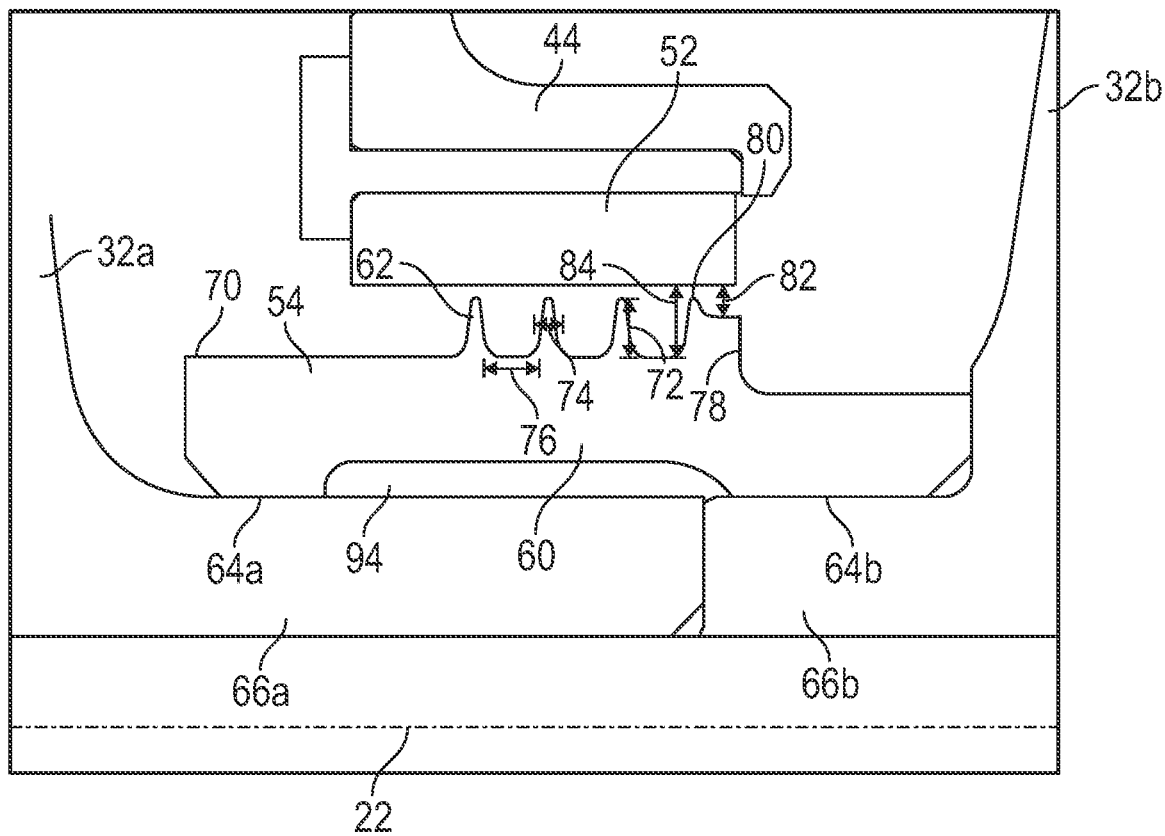
FIG. 3 is a partial cross-sectional view illustrating an embodiment of a labyrinth seal.

Referring now to FIG. 3, the labyrinth seal 54 includes a seal base 60 and a plurality of seal fins 62 extending from the seal base 60 toward the inner airseal 52. The seal base 60 includes at least one base surface 64 that mounts to a platform outer surface 66 of the blade platforms 56. In some embodiments, such as illustrated in FIG. 3, the seal base 60 includes a first base surface 64a which mounts to a first platform outer surface 66a of the first blade platform 56a, and a second base surface 64b which mounts to a second platform outer surface 66b of the second blade platform 56b. While the first base surface 64a and the second base surface 64b are configured to engage the first platform outer surface 66a and the second platform outer surface 66b, respectively, a seal base recess 94 may be positioned between the first base surface 64a and the second base surface 64b and configured to be free of contact with the platform outer surfaces 66a, 66b.

The plurality of seal fins 62 extend from a base outer surface 70 and have a radial fin height 72, an axial fin width 74 and an axial fin pitch 76 between axially adjacent seal fins 72. In some embodiments, the fin height 72 is greater than the fin width 74. While the fin heights 72 of the seal fins 62 and axial fin pitch 76 illustrated in FIG. 3 are all the same, one skilled in the art will readily appreciate that the fin heights 72 and fin pitches 76 may be varied in the labyrinth seal 54.

As illustrated in FIG. 3, an end seal fin 62 of the plurality of seal fins 62 includes an integrated pulling face 78 extending radially toward the base outer surface 70. The pulling face 78 is axially offset from an axial position of a fin peak 80 of the seal fin 62, and is also radially inwardly offset from the radial position of the fin peak 80. A first radial offset 82 of a radially outwardmost point of the pulling face 78 from the fin peak 80 is less than a second radial offset 84 of the base outer surface 70 from the fin peak 80, such that the pulling face 78 radially protrudes from the base outer surface 70, but is radially recessed from the fin peak 80.

Figure 4:
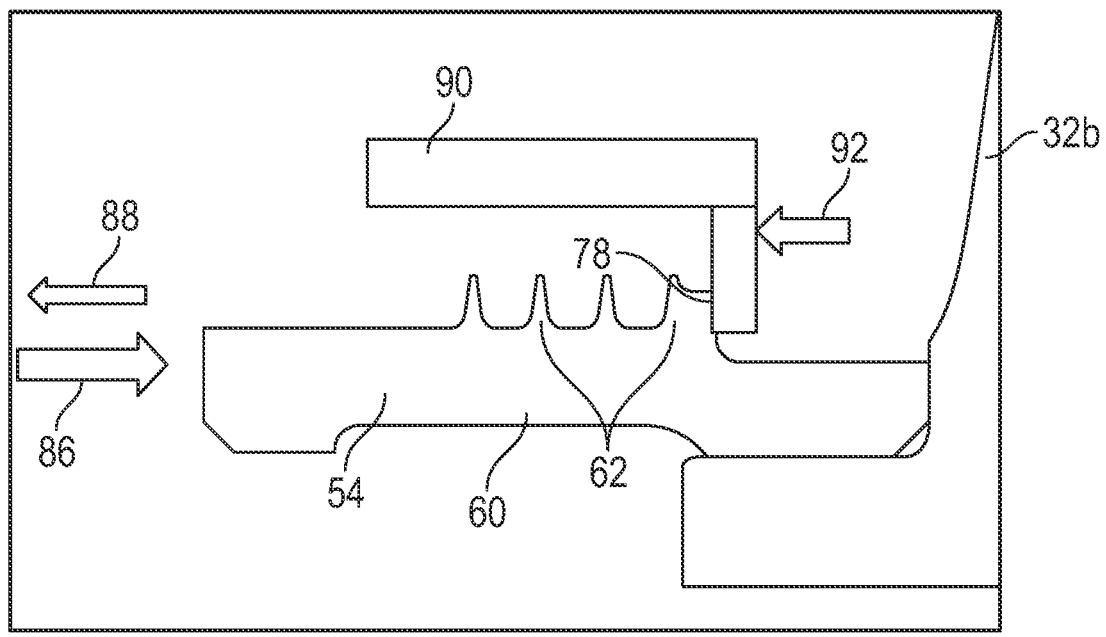
FIG. 4 is a schematic illustration of removal of a labyrinth seal from a gas turbine engine.

Referring now to FIG. 4, the labyrinth seal 54 is installed to the turbine rotors 32 axially in an installation direction 86. The labyrinth seal 54 is removed from the turbine rotors 32 axially in a removal direction 88 opposite the installation direction 86. Since the labyrinth seal 54 is a tight fit to the turbine rotors 32, removal is achieved via the use of a removal tool 90, schematically illustrated in FIG. 4. The removal tool 90 is configured to engage the pulling face 78 integrated to the end fin 62, where the end fin 62 is seal fin 62 axially closest to the turbine rotor 32 from which the labyrinth seal 54 is being removed from via the removal tool 90. When the removal tool 90 is pulled in the removal direction 88 the removal tool 90 applies a removal force 92 to the pulling face 78 and thereby urges the labyrinth seal 54 in the removal direction 88.

Configurations of the labyrinth seal 54 with the pulling face 78 integral to the end seal fin 62 reduces an axial length of the labyrinth seal 54 compared to those with a traditional configuration, while still providing the necessary sealing performance. These configurations also allow for easier removal of the labyrinth seal for service or replacement when needed, and reduces the possibility of damaging the labyrinth seal 54 and/or adjacent components such as turbine rotors 32, due to improved clearance between the removal features and the components, which allows easier access for the removal tool 90.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal of a gas turbine engine, comprising:
   a rotationally stationary seal element secured to a rotationally fixed component of the gas turbine engine; and
   a labyrinth seal element secured to and rotatable with a rotational component of the gas turbine engine, the labyrinth seal element including:
      a seal base;
      a plurality of seal fins extending outwardly from the seal base, the plurality of seal fins configured to define a seal interface between the plurality of seal fins and the rotationally stationary seal element to prevent airflow therethrough; and
      a removal face defined integral to an end fin of the plurality of seal fins, the removal face configured for application of a removal force thereto to remove the labyrinth seal from an installed position in the gas turbine engine.

2. The seal of claim 1, wherein a face height of the removal face from the seal base is less than a fin height of the adjacent seal fin from the seal base.

3. The seal of claim 1, wherein the removal force is applied substantially perpendicular to the removal face.

4. A turbine assembly of a gas turbine engine, comprising:
   at least one turbine rotor located at and rotatable about an engine central axis;
   a turbine stator disposed axially adjacent to the at least one turbine rotor; and
   a seal configured to seal between the at least one turbine rotor and the turbine stator, the seal including:
      a stator seal element secured to the turbine stator; and
      a labyrinth seal element secured to and rotatable with the at least one turbine rotor, the labyrinth seal element including:
         a seal base;
         a plurality of seal fins extending outwardly from the seal base, the plurality of seal fins configured to define a seal interface between the plurality of seal fins and the stator seal element to prevent airflow therethrough; and
         a removal face defined integral to an end fin of the plurality of seal fins, the removal face configured for application of a removal force thereto to remove the labyrinth seal from an installed position in the gas turbine engine.

5. The turbine assembly of claim 4, wherein a face height of the removal face from the seal base is less than a fin height of the adjacent seal fin from the seal base.

6. The turbine assembly of claim 4, wherein a face height of the removal face from the engine central axis is less than a fin height of the adjacent seal fin from the engine central axis.

7. The turbine assembly of claim 4, wherein the removal force is applied in an axial direction.

8. The turbine assembly of claim 4, wherein the at least one turbine rotor is two turbine rotors, the turbine stator disposed axially between the two turbine rotors.

9. The turbine assembly of claim 8, wherein the seal base is secured to both a first rotor of the two rotors and a second rotor of the two rotors.

10. The turbine assembly of claim 4, wherein the plurality of seal fins extend radially outwardly from the seal base toward the stator seal element.

11. The turbine assembly of claim 4, wherein the removal face extends radially outwardly from the seal base.

12. The turbine assembly of claim 4, wherein the labyrinth seal is secured to a blade platform of the at least one rotor.

13. A gas turbine engine, comprising:
   a combustor configured to combust a mixture of air and fuel;
   a turbine assembly including:
      at least one turbine rotor driven to rotate about an engine central axis by a flow of combustion gases from the combustor;
      a turbine stator located axially adjacent to the at least one turbine rotor; and
      a seal configured to seal between the at least one turbine rotor and the turbine stator, the seal including:
         a stator seal element secured to the turbine stator; and
         a labyrinth seal element secured to and rotatable with the at least one turbine rotor, the labyrinth seal element including:
            a seal base;
            a plurality of seal fins extending outwardly from the seal base, the plurality of seal fins configured to define a seal interface between the plurality of seal fins and the stator seal element to prevent airflow therethrough; and
            a removal face defined integral to an end fin of the plurality of seal fins, the removal face configured for application of a removal force thereto to remove the labyrinth seal from an installed position in the gas turbine engine.

14. The gas turbine engine of claim 13, wherein a face height of the removal face from the engine central axis is less than a fin height of the adjacent seal fin from the engine central axis.

15. The gas turbine engine of claim 13, wherein the removal force is applied in an axial direction.

16. The gas turbine engine of claim 13, wherein the at least one turbine rotor is two turbine rotors, the turbine stator disposed axially between the two turbine rotors.

17. The gas turbine engine of claim 16, wherein the seal base is secured to both a first rotor of the two rotors and a second rotor of the two rotors.

18. The gas turbine engine of claim 13, wherein the plurality of seal fins extend radially outwardly from the seal base toward the stator seal element.

19. The gas turbine engine of claim 13, wherein the removal face extends radially outwardly from the seal base.

20. The gas turbine engine of claim 13, wherein the labyrinth seal is secured to a blade platform of the at least one rotor.

\* \* \* \* \*